United States Patent [19]

Voigt

[11] 3,927,622
[45] Dec. 23, 1975

[54] FREIGHT LASHING APPARATUS, ESPECIALLY FOR AIRCRAFT

[75] Inventor: Werner Voigt, Weilheim, Germany

[73] Assignee: Messerschmitt-Bolkow-Blohm GmbH, Munich, Germany

[22] Filed: Dec. 16, 1974

[21] Appl. No.: 533,303

[30] Foreign Application Priority Data
Dec. 22, 1973 Germany............................ 2364270

[52] U.S. Cl............ 105/463; 105/366 C; 244/118 R
[51] Int. Cl.²......................................... B61D 45/00
[58] Field of Search ........... 105/463, 464, 465, 466, 105/473, 475, 478, 479, 480, 366 R, 366 B, 366 C; 244/118 R

[56] References Cited
UNITED STATES PATENTS

| | | | |
|---|---|---|---|
| 3,381,921 | 5/1968 | McDonough et al. | 105/366 R |
| 3,493,210 | 2/1970 | Brenner | 105/366 C X |
| 3,741,504 | 6/1973 | Alberti et al. | 244/118 R X |
| 3,796,397 | 3/1974 | Alberti | 244/118 R |

Primary Examiner—M. Henson Wood, Jr.
Assistant Examiner—Gene A. Church
Attorney, Agent, or Firm—Wolfgang G. Fasse; Willard W. Roberts

[57] ABSTRACT

This freight lashing apparatus comprises freight contact bail means responsive to freight movements in a forward and in both lateral directions. An unlocking means is responsive to freight movement in a reverse direction. The freight contact bail means and the unlocking means are both operatively connected to freight locking means to retract the freight locking means and the bail means below the loading floor so as not to interfere with the freight movement, especially in an aircraft.

12 Claims, 4 Drawing Figures

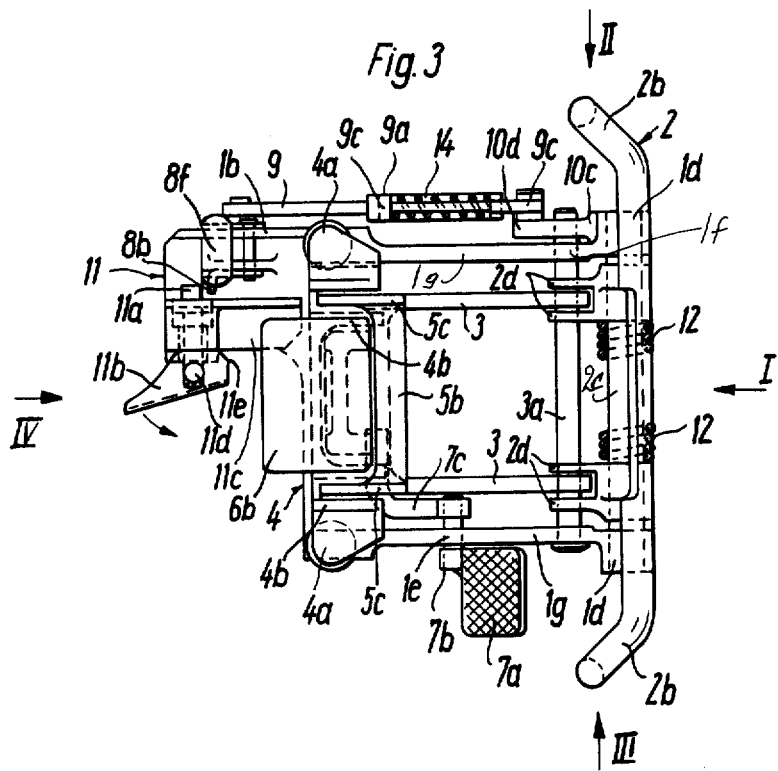
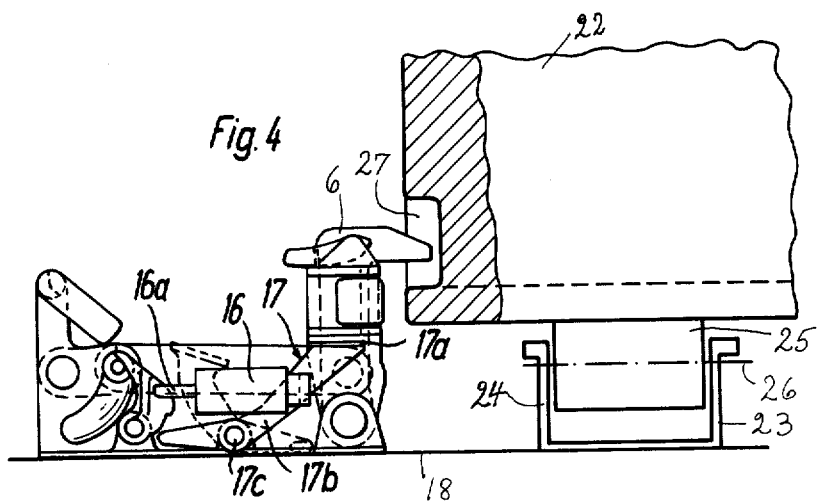

FREIGHT LASHING APPARATUS, ESPECIALLY FOR AIRCRAFT

BACKGROUND OF THE INVENTION

The present invention relates to freight lashing apparatus for securing freight to a loading floor, especially in an aircraft. Such devices usually include a locking mechanism tiltably supported in a housing for anchoring of freight containers or freight supporting carrier plates to the loading floor, especially in an aircraft. Roll over bail means are provided having at least two arms constituting run-up surfaces to be contacted by a freight container or a freight supporting plate. Thus, when these arms are contacted by freight, the entire lashing apparatus is automatically retracted to a position below the loading floor.

It has been suggested heretofore, for example, in German Patent Publication No. P. 23,40,319.8 to provide such freight lashing apparatus with means enabling the retraction in response to the movement of freight in a determined forward direction or in the opposite direction. This type of retraction is satisfactory, where it is certain that freight will only be moved forward and in a reverse direction. However, in many instances it may be desirable to assure the retraction of the latching mechanism even in response to any lateral freight movement.

OBJECTS OF THE INVENTION

In view of the above, it is the aim of the invention to achieve the following objects singly or in combination:

to provide a freight lashing apparatus, especially for aircraft, which is retractable in response to freight movements in all four directions on the loading floor, namely, forward, reverse, to the right and to the left;

to provide a freight lashing mechanism which will operate preferably by mechanical means so that it will be independent of any power supply although it may operate with power means, if the power supply is not interrupted;

to provide means which will unlock the freight locking mechanism in response to a reverse movement of freight;

to provide means which will latch the freight locking mechanism in its retracted position in response to freight movement in a predetermined direction;

to provide means which will arrest or lock the freight locking means in their working position;

to provide a freight contact member which is arrestable in a position below the loading floor;

to provide means which will return the lashing apparatus into its normal non-retracted position;

to provide roller means as part of the locking or latching means in order to reduce the friction between freight containers and the latching means; and to provide a power energized magnet for retracting the freight locking or latching mechanism into a position below the loading floor.

SUMMARY OF THE INVENTION

According to the invention there is provided a freight lashing apparatus having roll over bail means with freight contact surfaces arranged ahead of a first tilting axis, which is the tilting axis of bail supporting bell crank levers. These bell crank levers have normally upwardly directed arms to support the roll over bail and normally vertically directed arms connected to a freight locking mechanism. The forwardly or normally horizontally extending arms of the bell crank levers are connected by connecting bar means. The bar means in turn is connected to the freight locking mechanism proper by means of push rods. The push rods are journaled to support members of the locking mechanism. The locking mechanism comprises guide means which are effective in a given direction, such as the $y$-direction in an $x$-$y$-$z$ space coordinate system. The freight latch means are effective in a plane extending substantially perpendicularly to said given direction, such as the $x$-$z$ plane of said coordinate system. The bell crank levers are tiltable about said first tilting axis secured in a frame structure of the apparatus. The freight locking mechanism is tiltable about a second tilting axis also held in said frame structure. The push rods interconnecting the bell crank with the locking mechanism are journaled or pivoted to the locking mechanism above the second tilting axis. The connecting bar means have free ends which ride in respective guide slots in side walls of the frame structure. These slots are shaped as circular segments which extend downwardly and rearwardly as viewed in the forward direction of freight movement. An unlocking means is operatively connected to the freight locking mechanism for unlocking the freight locking mechanism in response to a reverse freight movement. This combination of features assures that the roll over bail as well as the locking mechanism are retracted into a position below the loading floor in response to any freight movement that is in response to freight movement in any one of four directions.

According to a further embodiment of the invention there is provided a device for unlocking the locking or latching mechanism in response to freight movement in the reverse direction. To this end there is provided a freight contact bail journaled with its axis to the frame structure of the apparatus. A push rod pivotally connected to the freight contact bail at one thereof is connected at the other end to one arm of a ratchet or pawl lever. This pawl lever is journaled to the frame structure and the cooperation of the just described elements is such that the pawl or ratchet lever shifts the above mentioned connecting bar out of its dead center position downwardly, whereby the ends of the connecting bar glide along said circular guide slots. As a result, the freight, for example, in the form of a container or platform pushes the lashing apparatus into a retracted position below the loading floor.

BRIEF FIGURE DESCRIPTION

In order that the invention may be clearly understood, it will now be described, by way of example, with reference to the accompanying drawings, wherein:

FIG. 3 is a plan view onto the apparatus shown in FIG. 1; and

FIG. 4 is a side view of a modified embodiment including an actuating magnet with a solenoid for unlocking the freight locking mechanism.

DETAILED DESCRIPTION OF EXAMPLE EMBODIMENTS:

The arrows shown in FIG. 3 indicate the four possible directions of freight movement. Thus, arrow I designates the forward freight movement. Further, arrow I points toward the rear end of the present apparatus. Arrow II indicates a lateral freight movement from right to left. Arrow III indicates a lateral freight movement from left to right. Arrow IV indicates a reverse freight movement. Further, arrow IV points toward the front end of the present apparatus, which is capable to respond to a freight movement in any of the just enumerated directions.

Figure 1:
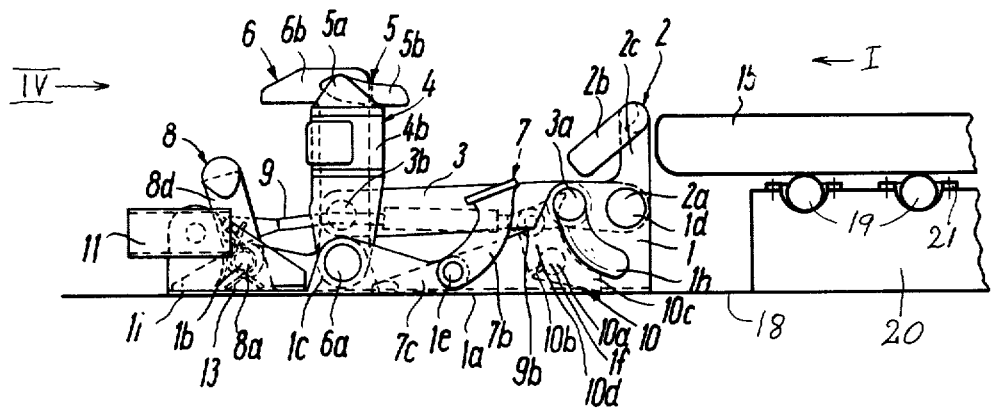
FIG. 1 is a side view of the apparatus according to the invention.

The present apparatus comprises a frame structure 1 including a base plate 1a and two side plates 1g. The frame structure is provided with a plurality of bosses 1b, 1c, 1d, 1e, and 1f to act as bearings for the various elements of the apparatus. Such bearings may be supports, or sleeve or roller or ball bearings. A bracket 1i extends out of the front end of the base plate 1a. The bearing 1b is supported on the bracket 1i. The bearing means 1c actually comprises six individual bearings shown in FIG. 2. The bearing means 1d comprise two bearings located in the side plates 1g of the frame structure. A further bearing 1e is located in the left side plate, whereas a still further bearing 1f is located in the right side plate of the frame structure. As best seen in FIG. 1 the side plates 1g are provided with guide slots 1h, which have the shape of a circle segment and extend downwardly and rearwardly toward the rear end of the frame structure 1. A roll over bail 2 is arranged adjacent to the rear end of the apparatus. The roll over bail 2 extends across the width of the apparatus so that the free ends 2b of the roll over bail 2, which form two slanted contact or run up surfaces extend outside of the apparatus proper for a tilting movement. The bail 2 is rigidly secured to two bell crank levers having normally upwardly directed arms 2c and normally forwardly and horizontally directed arms 2d. The bell crank levers are journaled with their knees on a first tilting axis 2a. The first tilting axis 2a is supported by the bearing bosses 1d. The lever arms 2d of the bell crank levers have forked ends to hold a connecting bar 3a as well as push rods 3. According to the invention, the roll over bail 2 is shaped in such a manner that the run up surfaces 2b are located ahead of the first tilting axis 2a. In other words, the slanted contact or run up surfaces 2b extend normally somewhat toward the horizontally extending arms 2d of the bell crank means. As mentioned, the forked lever arms d are provided with holes through which the connecting bar or axle 3a extends. This axle 3a has free ends which slidingly ride back and forth along the guide slots 1h. The axle 3a connects the forked lever arm ends 2d with two push rods 3 in a journaling or pivoting manner. The push rods 3 in turn are journaled to a locking mechanism by means of a bolt 3b.

The locking mechanism comprises guide means 4 which will be referred to as y-guide means in the following text. The locking mechanism further comprises a freight latch means 6 which will be referred to as the x-z-latch in the following text. The y-guide 4 is tiltably supported by means of support 4b held by the bearings 1c in the base plate 1a. On each side of the y-guide 4 and attached thereto there are provided vertical axes which support respective rotatable rollers 4a. These rollers 4a have such a radius that they protrude with their outer surface relative to a connection plate 4c, which rigidly interconnects the supports 4b of the y-guide 4. A latch pawl 5 is tiltably journaled to the upper end of the y-guide 4. The latch pawl 5 comprises a cross piece 5b and two side pieces 5c interconnected by the cross piece 5d and journaled on an axis 5a. The x-z-latch means 6 comprise a cross piece 6b having such dimensions as to fit into pockets 27 provided in a freight container 22, as shown in FIG. 4. The cross piece 6b is rigidly secured to an arm 6c, which in turn is journaled to a second tilting axis 6a. This second tilting axis 6a also serves as the journal axis for the above mentioned supports 4b of the y-guide 4. Further, as mentioned, the second tilting axis 6a is supported in the six bearing positions 1c.

The lashing apparatus according to the invention is further provided with a foot pedal or lever 7 for actuating the x-z-latch 6, in other words for moving the latch 6 upwardly into the freight locking position. The foot lever 7 comprises a foot plate 7a connected to a lever 7b located outside of the base plate 1a. The lever 7b is journaled in the bearing 1e in the side plate 1g. Further, the lever 7b is rigidly secured to a bell crank or angle lever 7c located inside the frame structure. The lever 7c is arranged for cooperation with the arm 6c of the x-z-latch 6.

An unlocking means 8 comprises a freight contact bail 8 held on a shaft 8a which is journaled in the frame structure, whereby a run over bail 8f is connected to the shaft 8a by means of two arms 8c and 8d. The contact bail 8 is held in its position by means of two torsion springs 13 located on the shaft 8a and arranged to act against each other. An arm 8d of the unlocking means is provided with a cam 8b, the purpose of which will be described below. A push rod 9 is journaled to the arm 8c of the contact bail 8 above the shaft 8a. A spring compensating device for the push rod 9 comprises a cylinder 9a and a piston riding in said cylinder and extending with its piston rod 9c through a compression spring 14. The opposite end of the piston rod 9c is pivoted to a pawl or ratchet lever 10 at the journal or pivot point 9b. The pawl lever 10 has a pivot point 10a and comprises two separate lever arms 10c and 10d. The lever arm 10d comprises a contact surface 10b for entraining the lever arms 10c when the lever arm 10d tilts in the forward direction. The unlocking means are mostly supported on the bracket 1i.

The bracket 1i further supports a safety device 11 which is responsive to a reverse freight movement in the direction of the arrow IV. The safety device 11 comprises a housing 11c having a bore in which a pin 11a is received. The pin is not rotatable, but movable to the right and left, back and forth, as best seen in FIG. 3. This motion is controlled by a cam lever 11b pivoted to the pin 11a for pivotal movement about the axis 11d, whereby the cam lever is provided with cam surfaces 11e shaped in such a manner that any tilting of the cam lever 11b withdraws the pin 11a. A compression spring not shown is located between the pin 11a and the housing 11c to urge the pin 11a into the locking position.

The pin 11a extends sufficiently out of the housing 11c so that the pin 11a is locked by the cam 8b in response to depressing of the freight contact bail 8. Two torsion springs 12 are arranged on the first tilting axis 2a of the roll over bail 2. These torsion springs 12 assure that the bail 2 is held in its normal starting position, namely, in the position in which the bell crank lever arms 2c are in a substantially vertical position.

As mentioned above, the x-z-latch 6 is dimensioned especially with regard to its width, so as to conveniently fit into the pockets 27 of a freight container 22. To this end the latch 6 may have a width of about 2½ inches. Where the latch 6 reaches into a pocket 27 it is effective in the x-direction, as well as in the z-direction of a space coordinate system.

Where the freight is supported on a plate 15, the latch 6 will clamp down on the plate 15 and thus will be effective in the z-direction only.

Incidentally, the loading floor or loading level may be defined by the tops of roller balls 19 supported by beams or plates 20 and held in position by ring washers 29. This structure is in turn supported on the floor 18 proper. Similarly, the loading floor or level may be defined by rollers 25 supported in rows 23 of U-beams 24, whereby these rollers 25 are rotatable about their respective axes 26. Here again, the rows 23 will be secured to the floor 18 proper. Similarly, the beams or plates 20 will be secured to the floor proper. In any event, the present latching apparatus wll be retracted to a position below the level defined by the tops of the balls 19 or by the rollers 25. The embodiment illustrated in FIG. 4 comprises a magnet or solenoid 16 with an armature 16a for unlocking the above described locking mechanism. However, when the power supply for the magnet 16 should not be available, the unlocking may be accomplished by the foot pedal 17 by simply stepping on the foot plate 17a, which acts on a lever 17b to rotate about a journal or pivot point 17c, whereby in turn the pawl lever 10d is rotated about its pivot point 9b in a rearward direction for shifting the connecting bar 3a out of its dead center position downwardly and rearwardly to retract the present freight lashing apparatus.

Figure 2:
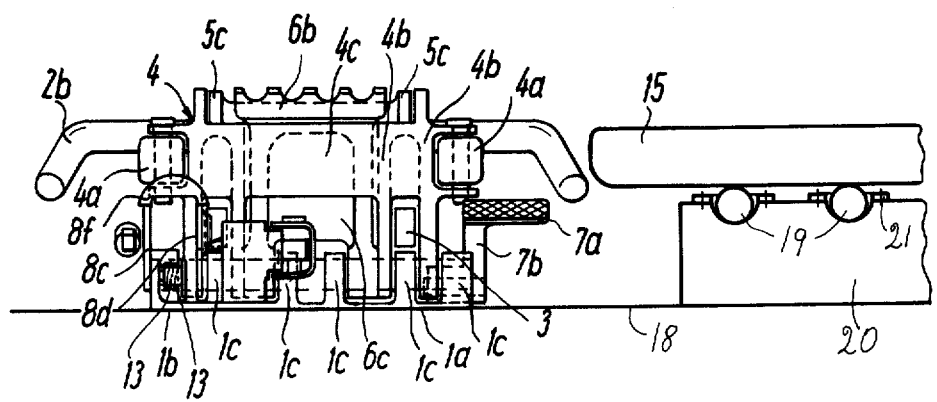
FIG. 2 illustrates a front view of the present apparatus as viewed in the direction of the arrow A in FIG. 1.

The operation of a preferred embodiment according to the invention will now be described. When a freight supporting plate 15, as shown in FIGS. 1 and 2 or a freight container 22 as shown in FIG. 4 moves in the direction of the arrow I, the freight will contact the roll over bail 2, which will tilt about the axis 2a, whereby due to the bell crank 2c, 2d the push rod 3 will be pulled downwardly and rearwardly as the connecting bar 3a rides with its ends in the guide slots 1h, also downwardly and rearwardly. Due to this motion of the connecting bar 3a, the guide 4 of the locking means is tilted rearwardly, that is in a direction opposite to the direction indicated by the arrow I. Simultaneously, the x-z-latch 6, which is supported on the second tilting axis 6a just as the guide 4, also tilts rearwardly. Due to the downward tilting of the guide 4, the cross piece 5b of the latch pawl 5 will contact the push rod 3, whereby the latch pawl 5 is tilted upwardly about its journal point 5a. Thus, the latch pawl 5 is disengaged and the x-z-latch 6 is unlocked, whereby it comes to rest on the base plate 1a. As the freight 15 or 22 moves further in the direction of the arrow I an edge of the freight will contact the bail 8, whereby the bail 8 is tilted in a counter-clockwise direction, or in a forward direction so to speak, about the tilting axis 8a. Since the push rod 9 is connected to the bail 8, the push rod 9 will also be pulled in a forward direction, whereby the push rod 9 will operate the pawl lever 10, which is journaled to the piston rod 9c and thus to the rod 9 at the journal 9b. The pawl lever 10 will tilt about its journal point 10a. As a result, the lever arm 10c of the pawl lever 10 will move upwardly against the cam surface 10b. However, the upward movement of the pawl lever 10 is limited or blocked by the downward movement of the connecting bar 3a. Simultaneously, the compression spring 14 on the piston rod 9c is biased. As soon as the freight 15, 22 has completely passed over the present latching apparatus, the elements will be returned into their original starting position. This applies to the guide 4 and to the latching pawl 5, as well as to the push rods 3 and the roll over bail 2. This return movement is accomplished by the biased torsion springs 12. In this starting position with the contact elements and the locking mechanism protruding above the level defined by the balls 19 or by the rollers 25 the connecting bar 3a is located in its so called dead center position and slightly above the first journal axis 2a as well as slightly above the journal axis 3b. The guide slots 1h retain the connecting bar 3a in this dead center position, while the x-z-latch 6 remains in the retracted position. In this condition of the apparatus, the freight may be moved along the rollers 4a of the guide 4 since the latch 6 is still retracted and thus does not interfere with the movement of the freight along the rollers 4a, which in this position rotate about their vertical axes.

When the freight reaches the latching position, the foot pedal 7 is actuated and the freight is latched or lashed down in the x-z-direction in the case of the container 22 with its pocket 27 or in the z-direction in the case of a freight supporting plate 15. To this end the latch 6 is tilted upwardly underneath the latch pawl 5. Upon reaching its latching position, the latch 6 is locked by the latch pawl 5, which due to gravity and its own weight falls back into its locking position. The contact bail 8 and the push rod 9, as well as the pawl lever 10 remain in their previously described position, when a piece of freight is thus latched.

In order to unlatch the apparatus, it is necessary to manually depress the roll over bail 2 in a downward direction. As a result, the latch 6 and the guide 4 will tilt downwardly as described above. The lever arm 10c of the latch lever 10 is biased by means of the compression spring 14 on the piston rod end 9c of the push rod due to the downward and rearward movement of the connecting bar 3a. The lever arm 10c of the pawl lever 10 locks the latch 6 in its lowest position by blocking the connecting bar 3a when the latter reaches its lowest position. The freight itself does not completely depress the roll over bail 2. As described, the lashing apparatus may be rolled over by the freight in any direction and the elements return into their upright position when the freight has cleared the lashing apparatus including the contact bail 8 and the roll over bail 2. Such return in the starting or upright position is automatically accomplished by the torsion springs 12, whereby the latch 6 remains in the retracted position until actuation of the foot pedal as described.

When a piece of freight moves or rolls across the present lashing apparatus, in the direction indicated by the arrows II and III, the freight will contact the run up surfaces 2b of the bail 2. Due to the special location of these run up surfaces 2b ahead of the tilting axis 2a, the roll over bail 2 will be tilted forwardly and downwardly in a counter-clockwise direction, whereby the above described retraction takes place in the same manner as described with reference to a forward freight movement. Similarly, the contact bail 8, due to its special position according to the invention is also tilted in a forward or counter-clockwise direction by a cross freight movement, whereby again the above described tilting takes place just as in case of a longitudinal freight movement.

A reverse freight movement will now be described whereby the freight moves in the direction of the arrow IV. In this instance, the freight contact bail 8 will be tilted in a clockwise direction or rearwardly. The push rod 9 is rigid in this direction and presses the lever arm 10d with its upper part against the connecting bar 3a to move the latter out of its dead center position. As a result, the freight can not tilt the guide 4 downwardly and may thus pass over the lashing apparatus, whereby the operation is the same as described above with reference to a forward freight movement.

If the freight contact bail 8 is manually depressed in a forward or counter-clockwise direction prior to a freight movement in the reverse direction, the pin 11a of the safety device 11 will engage the cam 8b of the freight contact bail 8 to lock the latter. Thus, the freight cannot actuate the contact bail 8 and will run against the rigidly upstanding guide 4. In order to release the locking of the bail 8, it is necessary to actuate the release flap 11b of the safety device 11 in a counter-clockwise direction as indicated by the arrow in FIG. 3. As a result, the pin is withdrawn and the bail 8 returns into its starting position under the action of the torsion spring 13.

It is frequently necessary to provide several lashing means for one freight container especially in freight aircrafts. To locate the freight into the lashing down position, it may be necessary to move it in a reverse direction, which is the y-direction indicated by the arrow I in FIG. 1. To this end it is necessary that the lashing devices in front of the container can be brought into their downward or retracted position. This is accomplished according to the invention by the push rod 9 with its spring compensating means including the piston cylinder arrangement 9a, 9c and the compression spring 14. Further, for the same purpose the pawl lever 10 is provided with a cam surface which in response to the forward or counter-clockwise tilting of one of the lever arms engages or entrains the other lever arm of the pawl lever 10.

In order to avoid that a freight container, which is provided with pockets 27, as shown in FIG. 4 runs against the latch 6, it is necessary to arrest the latch 6 in its freight locking or latching position. To this end there is provided, according to the invention, at the upper end of the guide 4 the above mentioned locking pawl 5, which is tiltable under its own weight and which comprises side pieces 5c interconnected by a cross piece 5b.

The above described foot pedal 7a is provided for moving the x-z-latch 6 into the locking position in order to avoid operating the latching mechanism by hand.

In order to permit the freight movement along several lines or rows of latching devices, it is necessary to arrest the freight contact bail 8 in its retracted position. This is accomplished according to the invention by the above described safety device 11 supported on the bracket 1i, and comprising the retractable pin 11a, which is movable back and forth but non-rotatable, and which engages a cam or recess of the freight contact bail 8. The retraction is accomplished by the contoured cam surface 11e, which engages the pin housing 11c as best seen in FIG. 3. If desired, the cam surface 11e may be so shaped as to retract the pin 11a by moving the release lever 11b in the clockwise or in the counter-clockwise direction.

The guide 4 is effective in the y-direction during the loading and unloading of freight. In order to return the guide 4 into its starting position, the torsion springs 12 are provided on the first tilting axis 2a for returning the roll over bail 2 and with this bail also the guide into the starting position. Incidentally, the friction between freight, especially freight containers and the y-guide is reduced by the rollers 4a, which are rotatable about vertical axes as best seen in FIGS. 2 and 3.

According to a modified embodiment of the invention, it is possible to obviate the unlocking mechanism 8 for the locking device 4, 6. Thus, the contact bail 8, the compensation spring elements 9, 9a, 9b, 9c, and 14 as well as one arm of the pawl lever 10 can be obviated by providing an electromagnet with a solenoid which is operatively connected to one lever arm of the pawl lever 10. The cooperation between the magnet 16 and the lever 10 is such that upon energizing of the magnet the lever 10 moves the connection bar 3a which connects the bell crank of the bail 2 with the push rod 3, out of its upper, dead center position. If there is a power failure, the pawl lever 10 is pushed rearwardly, by actuating the foot pedal 7a. The effect is the same in both instances. After the freight has rolled over the present apparatus, the foot actuating means return to their starting position, as described.

Although the invention has been described with reference to specific example embodiments, it is to be understood, that it is intended to cover all modifications and equivalents within the scope of the appended claims.

What is claimed is:

1. A freight lashing apparatus for securing freight to a loading floor, comprising a frame structure, a first tilting axis (2a) held in said frame structure, bell crank lever means tiltably supported on said first tilting axis and having normally vertically extending arm means and normally horizontally extending arm means, roll over bail means (2) held by said normally vertically extending arm means, said roll over bail means having two slanted contact surfaces extending normally toward said horizontally extending arm means, push rod means, bar means (3a) connecting said normally horizontally extending arm means of said bell crank lever means to one end of said push rod means (3), said conneting bar means having free ends, guide slots in said frame structure, each of said free ends of said connecting bar means (3a) riding in a respective one of said guide slots, a freight locking mechanism (4,6), a second tilting axis (6a) also held in said frame structure and tiltably supporting said freight locking mechanism, means journaling the other end of said push rod means (3) to said freight locking mechanism above said second tilting axis, and unlocking means (8) operatively connected to said locking means, said roll over bail means being responsive to a forward and lateral freight movement and said unlocking means (8) being responsive to a reverse freight movement, whereby said bell crank lever means with the roll over bail means and the locking mechanism are tiltable into a retracted, lowered position below said loading floor in response to freight movement in any direction.

2. The apparatus according to claim 1, wherein said frame structure has a rear end adjacent to said first tilting axis and a front end substantially adjacent to said unlocking means, and wherein said slanted contact surfaces of said roll over bail means extend laterally outside said frame structure, said slanted contact surfaces further extending downwardly away from said rear end and thus toward said front end, whereby said slanted contact surfaces are located ahead of said first tilting axis.

3. The apparatus according to claim 1, wherein said freight locking mechanism comprises guide means (4) effective in a given direction and freight latch means (6) effective in a plane extending substantially at a right angle relative to said given direction.

4. The apparatus according to claim 1, wherein said frame structure has a rear end adjacent said first tilting axis and wherein said guide slots for said free ends of the connecting bar means (3a) have a shape substantially following a circle segment extending downwardly and toward said rear end.

5. The apparatus according to claim 1, wherein said unlocking means (8) comprise a freight contact bail responsive to a reverse freight movement, a shaft (8a) tiltably supported in said frame structure and supporting said freight contact bail, actuating means (9) connected at one end thereof to said freight contact bail, and ratchet lever means pivotally connecting the other end of said actuating means (9) to said connecting bar means (3a), whereby the ratchet lever means (10, 10d) move downwardly said connecting bar means (3a) and thus out of dead center.

6. The apparatus according to claim 5, wherein said actuating means of said unlocking means comprise spring compensating means including piston cylinder means and a piston rod (9a, 9c) and a compression spring on said piston rod, said ratchet lever means (10) comprising cooperating lever arms (10c, 10d) and a cam surface (10b) arranged for entraining one of said cooperating lever arms in response to a forward tilting of the other of said cooperating lever arms whereby said connecting bar means (3a) are moved out of dead center.

7. The apparatus according to claim 1, wherein said freight locking mechanism comprises guide means (4) effective in a given direction, and latch means (6) effective in a plane extending substantially at a right angle relative to said given direction, said guide means (4) effective in a given direction comprising locking pawl means (5) journaled to said guide means and including side pieces (5c) and a cross piece (5b) interconnecting said side pieces, said locking pawl means being arranged for effectively locking said freight latch means (6) in its operative, freight latching position.

8. The apparatus according to claim 1, wherein said freight locking mechanism comprises latch means (6) effective in a given plane, said apparatus further comprising a foot pedal arranged outside said frame structure, and lever means connecting said foot pedal to said latch means for locking said latch means in a freight latching position by an operation of said foot pedal.

9. The apparatus according to claim 1, further comprising a contact safety device (11) including a bracket (1i) secured to said frame structure for supporting said contact safety device (11) which comprises a pin (11a) movable back and forth and arranged normally for cooperating engagment with said unlocking means, said safety device further comprising cam lever means (11b, 11e) pivoted to said pin for withdrawing said pin from engagement with said unlocking means in response to tiltng of said cam lever means.

10. The apparatus according to claim 1, further comprising torsion spring return means (12) arranged on said first tilting axis (2a), said torsion spring return means being biased against said roll over bail means (2) for returning said roll over bail means and thus also said freight locking mechanism.

11. The apparatus according to claim 1, wherein said freight locking mechanism comprises latch means (6) effective in a given plane, vertical axes means secured to said latch means, and roller means (4a) rotatably supported on said vertical axes means.

12. The apparatus according to claim 1, wherein said unlocking means (8) comprise actuating magnet means (16, 16a) operatively connected for unlocking said freight locking means.

\* \* \* \* \*